Sept. 19, 1933. J. P. GRILLI ET AL 1,927,518
METHOD AND APPARATUS FOR CHARGING BLAST FURNACES
Filed Oct. 24, 1930  2 Sheets-Sheet 2

Inventors.
John P. Grilli,
Harry L. Wetherbee,
By Wilkinson, Huxley, Byron & Knight attys.

Patented Sept. 19, 1933

1,927,518

UNITED STATES PATENT OFFICE 1,927,518

METHOD AND APPARATUS FOR CHARGING BLAST FURNACES

John P. Grilli and Harry L. Wetherbee, Chicago, Ill., assignors to H. A. Brassert & Company, Chicago, Ill., a corporation of Illinois Application October 24, 1930. Serial No. 490,846

3 Claims. (Cl. 214—2)

Our invention relates to a new and improved method and apparatus for the charging of blast furnaces and more particularly to a method and apparatus which involves the automatic weighing of the elements of the furnace charge.

The three principal materials which make up the blast furnace burden are coke, limestone and iron ore. It is the usual practice to measure the coke by volume and to weigh the ore and limestone in a scale car equipped with recording dials. At some plants a part of the coke is also weighed in the scale car with a view of equalizing variations in the weight of coke charged due to varying moisture content and also to varying size.

Of the three materials the coke forms by far the largest amount in volume, although being generally about one-half the amount in weight as compared to the ore, while the limestone is usually from one-fourth to one-fifth by weight of that of the ore.

The ore burden usually consists of a number of different ores, all of which have to be weighed separately, and therefore the limestone is usually the largest single item in the burden outside of the coke. Furthermore, the limestone has to be charged with every round of ore and in some cases it is considered advisable to charge it twice with each round of ore. The limestone is much bulkier than the ore, usually weighing about one-half as much per cubic foot. It is hard and refractory and wears out the scale car far more rapidly than the ore, which is generally of a soft nature or finely crushed. There is also an objection to carrying limestone in the scale car in wet weather as the fines of the limestone, which are unavoidable, stick to the bottom and sides of the scale car and render the weights of the limestone and of the ore inaccurate. Inaccuracies in the weight of limestone are more serious than inaccuracies in the weight of any other material, since the limestone is charged for fluxing purposes and very accurate proportions are imperative.

In recent years the capacity of blast furnaces has been very greatly increased, in fact it has been doubled in many cases. This has put an unforeseen strain on the charging apparatus as well as on the operators of the charging equipment. It has also been the cause of irregular and inaccurate charging, resulting in inefficient practice on the blast furnace.

To overcome these difficulties we have devised a new method of charging those materials which heretofore had to be brought in in the scale car, particularly limestone. We place the limestone bins on each side of the skip pit and design them in such a way that the limestone may be discharged from the bins directly into a weigh hopper located so that it may be discharged into the skip tubs. When the correct amount of stone has been drawn from the pocket into the weigh hopper, an electric control on the weigh mechanism automatically shuts the feed gate, and when the right or left skip tub in a double skip hoist has arrived at the bottom of the pit, the proper discharge gate on the weigh hopper is automatically opened. It will be readily seen that this device saves a scale car operator a large percent of his time, which actually figures about one-third of his total time used for weighing the limestone and other materials. More time is spent on the stone than the ore on account of the difficulty heretofore mentioned. Therefore, the speed of charging the furnace is increased approximately in this ratio.

Many variations from the device shown may be made without deviating from our invention. If any one of the ores forms a larger portion of the burden than limestone and is otherwise objectionable to be handled in the scale car, this ore may be substituted for the stone and handled through the automatic weigh hopper or additional weigh hoppers may be provided. In any case, the weighing and the discharging of the material in the weigh hopper is automatic and controlled by the operation of the skip tubs so that the material so charged must come in a certain sequence and at the correct place in between the other materials making up a charge or round of the blast furnace burden.

Most furnaces today are equipped with revolving tops, the motion of which is also automatically governed and interlocked with the movement of the skips. The movement of the weigh hopper by being interlocked with the movement of the skip tubs will therefore automatically be interlocked with the movements of the revolving top. In any case, except when an occasional variation of the regular round is required and the scale car operator breaks the set sequence, the motion of the skip tub is the master movement controlling both revolving top and the automatic charging hopper, so that failure of the revolving top to move or complete its cycle will not interfere with the correct discharge of the material in the weigh hopper.

It is an object of the present invention to provide a new and improved method and apparatus for charging blast furnaces and more particularly for charging the skip buckets of such furnaces.

It is an additional object to provide a method and apparatus in which the material fed to the skip bucket is automatically weighed.

It is a further object to provide a method of this character which is adapted for use with existing blast furnace installations without material alterations therein.

Other and further objects will appear as the description proceeds.

We have shown a preferred form of our invention in the accompanying drawings, in which:

Figure 2 is a view of the apparatus of Figure 1 as seen from the left; and

Figure 3 is a diagrammatic showing of an electric control circuit suitable for use with the apparatus.

Figure 1:
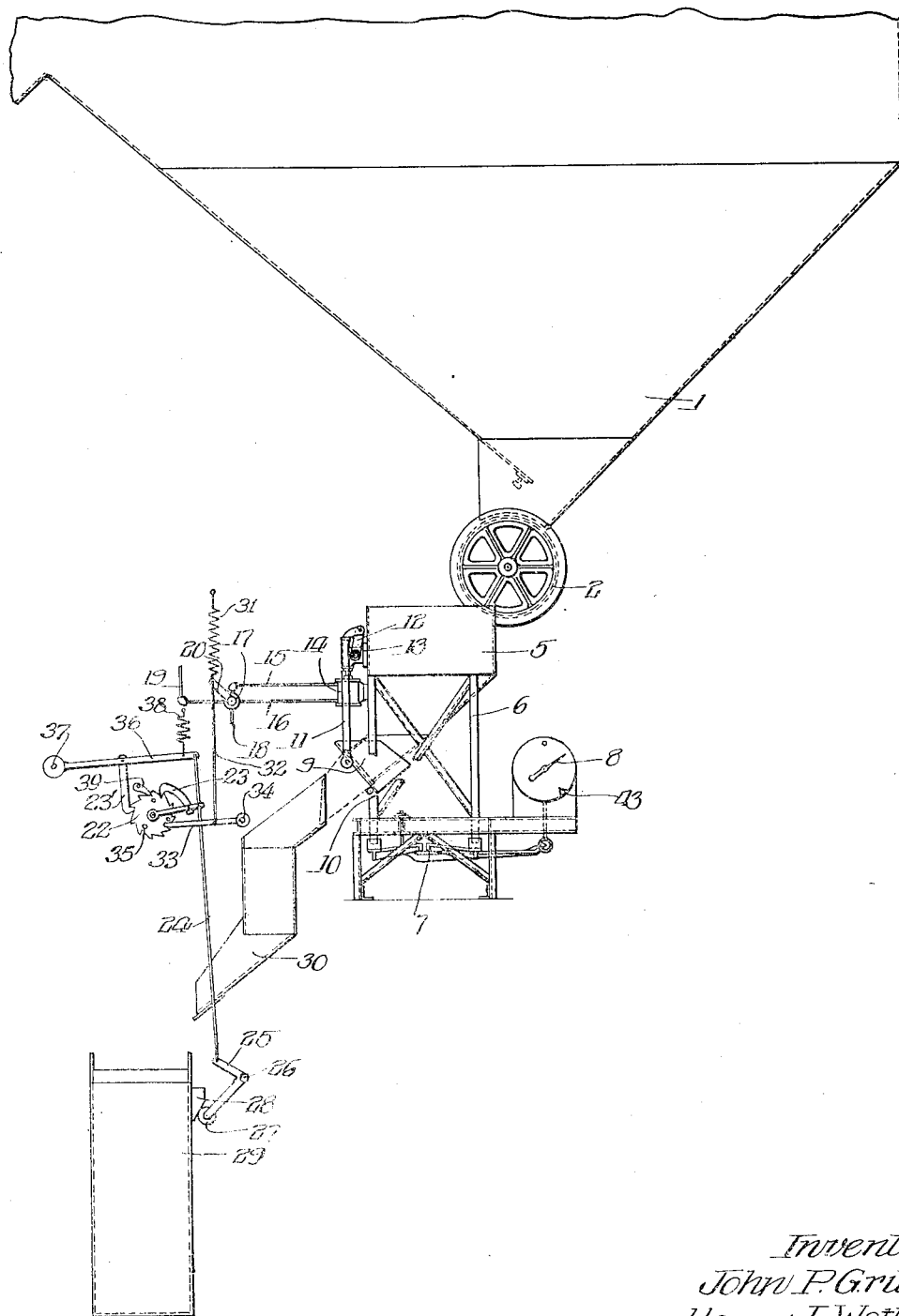
Figure 1 is a side elevation of the apparatus.

In the drawings the bin has been shown at 1, the bin being suitable for holding ore, limestone or coke, as desired. The discharge from the bin is controlled by a gate 2 of the roller type operated by motor 3 through gear train 4.

The material is discharged into a weighing hopper 5 supported by standards 6 from the weighing mechanism 7, which latter is connected to the indicating pointer 8. The lower side of the hopper 5 is controlled by the gate 9 which is hinged at 10 and operated by the link 11. The link 11 is connected to arm 12, this arm being connected to shaft 13 which is rotated by a piston operated by cylinder 14. The movement of the piston in cylinder 14 is controlled by compressed air through pipes 15 and 16 connected to the four-way valve 17. The four-way valve 17 has the air discharge pipe 18 and the compressed air inlet pipe 19.

The four-way valve 17 is operated by arm 20, to which is connected the depending pull rod 21. This pull rod 21 may be manually operated by the operator or by means of the sequence apparatus which is diagrammatically shown. The ratchet wheel 22 is rotated step by step by the ratchet arms 23 and 23' which are operated by the up and down movement of the pull rod 24 which has its lower end connected to the bell crank lever 25, the latter being pivotally supported at 26. The arm 20 is normally held in the upper position by spring 31 and is connected to rod 32 which in turn is connected to arm 33 pivoted at 34. The end of the arm 33 is actuated by the studs 35 on the ratchet wheel 22. The arm 36 which carries the ratchet arm 23' is pivoted at 37 and has its other end, which is connected to pull rod 24, held upwardly by the spring 38. The pawl 39 prevents reverse movement of ratchet wheel 22. The bell crank 25 has a roller 27 engaged by lug 28 on the skip bucket 29 so that the ratchet wheel 22 is rotated clockwise one notch for each up or down movement of the skip bucket. The weigh hopper may thus be automatically discharged into the bucket once in any predetermined number of skip movements, the material being led to the bucket 29 by the chute 30. It will be understood that other hoppers and chutes may be placed on other sides of the bucket for discharging other materials in alternate sequence if desired.

Referring now to the electrical circuit shown in Figure 3, the wires 31 and 32 are the feeder conductors from a source of electric power. The wire 33 leads from wire 31 to wire 34 which connects to contact 35 and contact 36 and to solenoid switch 37 operated by solenoid plunger 38. Adjacent contact 35 the contact 39 is connected to the bin gate motor 3 and to the pointer 8 by wire 40. The other side of the motor 3 is connected to solenoid switch 41 operated by solenoid plunger 42. The pointer 8 is adapted to contact with the adjustable contact 43 which is connected by wire 44 to the solenoid switch 45 operated by solenoid plunger 46.

Adjacent the contact 36 is located the contact 47 which is connected by wire 48 to the contact 49 of solenoid switch 37 and also by wire 50 to the solenoid coils 51, 52 and 53 operating plungers 38, 42 and 46 respectively. The other sides of these three solenoid coils 51, 52 and 53 are connected by wire 54 to wire 55 which is connected at one end to contact 56 of the solenoid switch 41 and at the other end to solenoid switch 57 operated by plunger 58 which is moved by solenoid coil 59. Switch 57 is normally closed. The other side of switch 57 is connected by wire 60 to the feed wire 32 and to one side of solenoid coil 59. The other side of solenoid coil 59 is connected to contact 61 of solenoid switch 45.

The weigh hopper operating arm 12 carries the contact 62 adapted at the end of movement to close the circuit through contacts 35 and 39 and the contact 63 adapted at the other end of movement to close the circuit between contacts 36 and 47.

In the operation of the apparatus shown, when the bucket 29 is located in the receiving position as shown in the drawings, the four-way valve 17 is operated either manually or mechanically to admit compressed air through pipe 15 into the upper side of the cylinder 14, thus rotating the shaft 13 in the counterclockwise direction and opening the gate 9 of the weigh hopper 5. The material is then discharged from the weigh hopper through chute 30 into the bucket 29. As the material begins to leave the weigh hopper 5, the indicating hand 8 leaves the contact 43 and moves back towards zero, reaching zero when the hopper is entirely empty.

As the gate 9 is opened, the arm 12, carrying the electrical contacts shown in Figure 3, moves so as to open the circuit between terminals 35 and 39, and when the gate is fully opened the contact 63 closes the circuit between terminals 36 and 47. This closes the circuit by way of wires 31, 33, 34, 48 and 50 through the solenoid coils 51, 52 and 53 and through wire 54 and the normally closed switch 57 and wire 60 to the other power lead 32. These three solenoid coils 51, 52 and 53, when energized, immediately draw upwardly their respective plungers 38, 42 and 46, thus closing switches 37, 41 and 45. The closing of the switch 37 causes it to engage contact 49 and thus completes a circuit through the wire 48 and the solenoid coils independently of the circuit through contacts 36 and 47. The solenoid circuit is thus maintained after the arm 12 again moves to move the contact 63 away from these contacts 36 and 47.

The switch 41 engaging contact 56 closes the circuit through the motor 3, with the exception of the break between contacts 35 and 39. Switch 45 engaging contact 61 also completes the circuit through the dial pointer 8 with the exception of the fact that contact is broken between the indicator hand 8 and the adjustable contact 43.

As soon as the weigh hopper 5 is empty, the operator or the automatic control reverses the air valve 17 causing the cylinder 14 to operate to close the gate 9. This causes a movement of the arm 12 such as to bring the contact 62 across the contacts 35 and 39 and closes the circuit through the feed motor 3. When the contact 63 leaves the terminals 36 and 47, the circuit is maintained through the solenoid coils by the by-pass circuit closed by switch 37, as has been above described. The motor circuit being closed, the motor 3 rotates the drum 2 through the gear train 4 and material flows from the bin 1 into the weigh hopper 5. As the weight of the material causes the hopper to descend, the connections to the indicating dial cause the hand 8 to rotate until, when a predetermined weight of material is in the hopper, the hand 8 engages the adjustable contact 43. This closes the circuit through wire 40, the contact hand 8, the adjustable contact 43, wire 44, switch 45, contact 61, solenoid coil 59 and wire 60 to the other side of the feed line 32.

The solenoid coil 59 draws its plunger 58 downwardly opening the switch 57. This opening of the switch 57 serves to break the circuit through the motor 3, stopping the motor and stopping the discharge of material into the weigh hopper 5. The opening of the switch 57 further breaks the circuit through wire 54 to the solenoid coils 51, 52 and 53, and these coils being de-energized, the switches 37, 41 and 45 are opened. The opening of switch 45 serves to de-energize solenoid coil 59, permitting the switch 57 to again close. This does not serve, however, to close the motor circuit since switch 41 is open and does not serve to close the circuit through the solenoid coils 51, 52 and 53, since the switch 37 is open and the circuit is also open through contacts 36 and 47.

The parts are now all returned to their initial position and the apparatus is again provided with the weigh hopper containing a measured amount of material ready for dumping whenever the four-way valve 17 is suitably operated either manually or by means of the automatic control operated by the skip bucket 29. The details of the automatic sequence control for the valve 17 shown, form no part of the present invention and any sequence control may be used at this point without modifying the invention.

While we have shown and described certain preferred embodiments of our invention, these are to be understood as illustrative only, since the apparatus is capable of change and modification to meet varying requirements and conditions and we contemplate such changes and modifications as come within the spirit and scope of the appended claims.

We claim:

1. Apparatus for charging a blast furnace, comprising a material bin, a weigh hopper, a power discharge for the bin, means governed by the weight of material in the hopper for controlling the power discharge, a skip bucket, means for automatically discharging the material from the weigh hopper into the skip bucket, and means operated by the skip bucket for controlling the refilling of the hopper.

2. Apparatus for charging a blast furnace, comprising a material bin, a weigh hopper, a motor driven feed from the bin to the hopper, a skip bucket, a discharge gate and chute whereby material is discharged from the weigh hopper to the bucket, an adjustable automatic control operated by the weight of material in the weigh hopper for opening the circuit of the feed motor, and control means actuated by movement of the skip bucket for restarting the discharge of material to the hopper.

3. Apparatus for charging a blast furnace, comprising a material bin, a weigh hopper, a motor driven feed from the bin to the hopper, a skip bucket, a discharge gate and chute whereby material is discharged from the weigh hopper to the bucket, an adjustable automatic control operated by the weight of material in the weigh hopper for opening the circuit of the feed motor, automatic means operated by the skip bucket for operating the discharge gate of the weigh hopper, and automatic means operated at selected intervals by movement of the skip bucket to close the circuit of the feed motor.

JOHN P. GRILLI.
HARRY L. WETHERBEE.